W. G. LUTTINGER.
AUTOMOBILE FENDER.
APPLICATION FILED APR. 23, 1919.
1,315,676.
Patented Sept. 9, 1919.
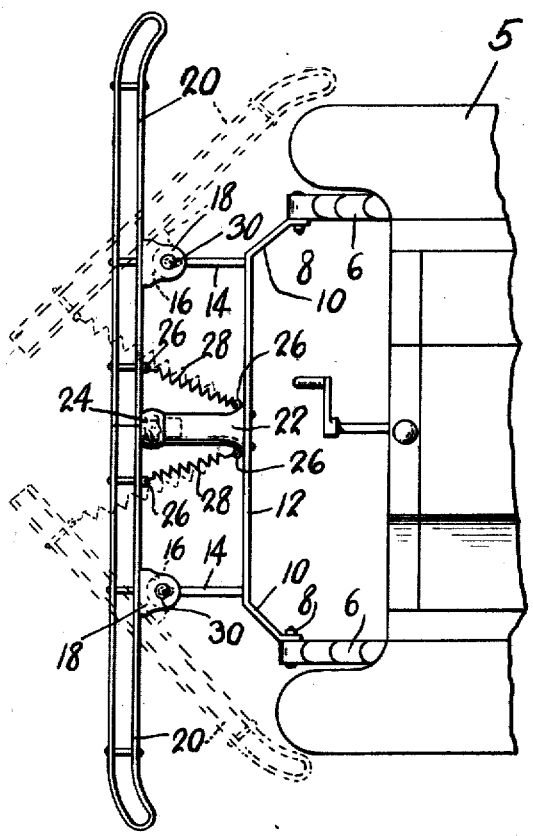
William G. Luttinger, Inventor
Witness
L. B. James
M. F. Bergen
By Whitton Buck
Attorney

UNITED STATES PATENT OFFICE.

WILLIAM G. LUTTINGER, OF MORENCI, ARIZONA.

AUTOMOBILE-FENDER.

1,315,676.  Specification of Letters Patent.  Patented Sept. 9, 1919.

Application filed April 23, 1919. Serial No. 292,223.

*To all whom it may concern:*

Be it known that I, WILLIAM G. LUTTINGER, a citizen of the United States, residing at Morenci, in the county of Greenlee and State of Arizona, have invented certain new and useful Improvements in Automobile-Fenders, of which the following is a specification.

This invention relates to automobiles and more particularly to a fender.

One of the objects of this invention resides in the provision of an automobile fender which will readily deflect an object to either side of the course in which the automobile is traveling should the object be struck a glancing blow.

Another object of this invention resides in the provision of an automobile fender which is capable of absorbing a shock when an object is struck a direct blow or when it is struck a glancing blow.

A further object of this invention resides in the provision of an automobile fender which will deflect an object to either side of the course of an automobile and return to its normal position when disengaged therewith.

A still further object of this invention resides in the provision of an automobile fender which consists of a certain combination of elements which coact in absorbing the shock of a direct or glancing blow with the tendency of deflecting the object struck to either side of the vehicle and out of the path of the wheels thereof.

With these and other objects in view this invention resides in certain novel features of construction, arrangement of parts and combination of elements to be more fully set forth in the specification herewith and pointed out in the appended claims, it being understood that the right is reserved to make such minor changes in detail as come within the scope of the claims.

In the accompanying drawing, the figure illustrates a plan view of the front portion of an automobile with a fender secured thereto, the same being shown in its deflecting position by dotted lines.

In the present embodiment of this invention, the numeral 5 designates an automobile which in this instance is shown as having forwardly projecting springs 6 but which are not necessarily employed to attain the paramount functions of this invention as it can be secured to any convenient portion of the automobile.

Rigidly secured as at 8 to the aforesaid springs are the forwardly converging arms 10 of a laterally extending bracket 12 to which are permanently secured forwardly extending arms 14 that have their outer ends provided with apertured heads 16 to pivotally support ears 18 that in turn support a fender consisting of companion sections or members 20.

The aforesaid sections or members may be constructed of any suitable material and are here shown as having their outer ends curved rearwardly and their inner ends made to contact when in normal position.

Secured centrally of the bracket 12 is a forwardly projecting boss 22 to the outer end of which is secured a resilient head 24 which is illustrated in the drawing as being made of a block of rubber.

Carried by each section or member of the fender and the bracket 12 are eye bolts or the like 26 which are adapted to be utilized for engagement with the ends of retractile coil springs 28 to retain the fender sections or members against the resilient head 24 in their normal positions.

With a fender of the above character, the sections or members 20 will readily rotate on their pivots 30 when contacting with an object that is struck by that portion of either section which is adjacent their outer ends and upon shifting the object to one side they will be returned to their normal position by the springs 28.

In the adoption of a fender of the present construction it is manifest that the danger of serious injury to pedestrians is reduced to a minimum and the possibilities of severe damage to the automobile also avoided.

Having thus described my invention what I claim is:

1. A fender comprising a pair of normally alined members, each of said members being pivotally supported for swinging movement, a bumper with which each of the members normally contacts for maintaining the members alined, and means for constantly urging the members toward the bumper.

2. A fender comprising a pair of normally alined members pivotally supported, a bumper with which the inner end portions of the members contact when in their normal position, and means for constantly urging the members to their normal position.

3. The combination of a sectional fender, ears secured to said sections, an arm pivotally secured to each ear, a bracket supporting said arms, a boss supported by said bracket, a resilient head supported at the outer end of said boss, eye bolts secured to each section of said fender and bracket, and coil springs secured to said eye bolts.

4. A fender comprising a supporting member, a pair of normally alined fender sections pivotally engaged with the supporting member, a buffer carried by the supporting member and with which the fender sections are normally substantially in contact, and means for constantly urging the fender sections to their normal positions.

5. A fender of the class described comprising a supporting member, normally alined fender sections pivotally engaged with said supporting member, an outstanding arm carried by the supporting member, a resilient head carried by the arm and with which the fender sections contact, and means for constantly urging the fender sections toward the resilient head.

In testimony whereof I affix my signature.

WILLIAM G. LUTTINGER.